(12) United States Patent
Dunn

(10) Patent No.: US 9,429,267 B2
(45) Date of Patent: Aug. 30, 2016

(54) PIPE SYSTEMS

(71) Applicant: Donald C. Dunn, Mesa, AZ (US)

(72) Inventor: Donald C. Dunn, Mesa, AZ (US)

( * ) Notice: Subject to any disclaimer, the term of this patent is extended or adjusted under 35 U.S.C. 154(b) by 219 days.

(21) Appl. No.: 14/272,359

(22) Filed: May 7, 2014

(65) Prior Publication Data

US 2014/0332105 A1 Nov. 13, 2014

Related U.S. Application Data

(60) Provisional application No. 61/820,535, filed on May 7, 2013.

(51) Int. Cl.
| | |
|---|---|
| *F16L 55/00* | (2006.01) |
| *F16L 57/06* | (2006.01) |
| *F16L 9/14* | (2006.01) |
| *F16L 58/14* | (2006.01) |

(52) U.S. Cl.
CPC .................. *F16L 57/06* (2013.01); *F16L 9/14* (2013.01); *F16L 58/14* (2013.01)

(58) Field of Classification Search
CPC .............................. F16L 57/06; B65G 53/523
USPC ........................... 138/36, 104, 137, 140, 141
See application file for complete search history.

(56) References Cited

U.S. PATENT DOCUMENTS

| | | | | |
|---|---|---|---|---|
| 4,130,300 A | * | 12/1978 | Sheridan | F16L 57/06 258/16 |
| 4,684,155 A | * | 8/1987 | Davis | B65G 53/523 138/139 |
| 5,634,497 A | * | 6/1997 | Neto | F16L 11/088 138/104 |
| 5,884,851 A | * | 3/1999 | Colavito | B05B 7/149 138/DIG. 6 |
| 6,386,237 B1 | * | 5/2002 | Chevalier | F16L 11/12 116/208 |
| 6,467,812 B1 | * | 10/2002 | Klemm | E04G 21/04 285/112 |
| 6,527,015 B2 | * | 3/2003 | Lively | C09D 163/00 138/146 |
| 8,701,714 B2 | * | 4/2014 | Jansson | B32B 1/08 138/104 |
| 2014/0216593 A1 | * | 8/2014 | Lenes | F16L 57/06 138/141 |

FOREIGN PATENT DOCUMENTS

| | | | | | |
|---|---|---|---|---|---|
| CN | | 201071983 Y | * | 6/2008 | |
| WO | WO 2013009188 A1 | | * | 1/2013 | ......... E21B 17/1007 |

\* cited by examiner

*Primary Examiner* — Patrick F Brinson
(74) *Attorney, Agent, or Firm* — Lodestar Patents, PLLC; Raymond J.E. Hall

(57) ABSTRACT

A system relating to ceramic/rubberized lined steel pipes adapted to carry crushed rock and other highly abrasive materials.

18 Claims, 2 Drawing Sheets

PIPE SYSTEMS

CROSS-REFERENCE TO RELATED APPLICATION

The present application is related to and claims priority from prior provisional application Ser. No. 61/820,535, filed May 7, 2013, entitled "PIPE SYSTEMS", the contents of which is incorporated herein by this reference and are not admitted to be prior art with respect to the present invention by the mention in this cross-reference section.

BACKGROUND

This invention relates to providing a system relating to improved pipe and interior pipe lining. More particularly, this invention relates to providing a system for improving pipes that carry crushed rock and other highly abrasive materials. There has been no solution found to the problems, for example, of pipe wear-resisting linings having short lifespan due to high-wear areas like seams and/or vibration of the lining within the pipe, etc.

OBJECTS AND FEATURES OF THE INVENTION

A primary object and feature of the present invention is to provide a system overcoming the above-mentioned problem(s).

It is a further object and feature of the present invention to provide such a system making use of an elastic liner between a ceramic-tube wear-resisting surface and the pipe.

Another object and feature of the present invention is to provide such a system having an interior wear liner without a longitudinal seam.

Yet another object and feature of the present invention is to provide such a system having pressure change absorption.

A further object and feature of the present invention is to provide such a system having interior impact absorption.

It is a further object and feature of the present invention to provide such a system making use of an elastic liner between a ceramic-tube wear-resisting surface and the pipe to assist centering of the ceramic tube within the pipe.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to providing interior wear-resisting surfaces inside abrasive-material-handling pipes, comprising: at least one abrasive-material-handling pipe structured and arranged to internally handle at least one flow of abrasive material; at least one interior-wear resister structured and arranged to resist wear of the inside surface of such at least one abrasive-material-handling pipe; at least one force-change absorber structured and arranged to absorb force-changes occurring inside of such at least one abrasive-material-handling pipe while handling at least one flow of abrasive material; and at least one bond structured and arranged to bond such at least one interior-wear resister inside such at least one abrasive-material-handling pipe.

Moreover, it provides such a system wherein such at least one force-change absorber comprises at least one pressure-change absorber structured and arranged to absorb pressure changes occurring inside of such at least one abrasive-material-handling pipe while handling at least one flow of abrasive material. Additionally, it provides such a system wherein such at least one force-change absorber comprises at least one impact absorber structured and arranged to absorb impacts occurring inside of such at least one abrasive-material-handling pipe while handling at least one flow of abrasive material.

Also, it provides such a system wherein such at least one interior-wear resister comprises at least one layer of ceramic. In addition, it provides such a system wherein such layer of ceramic comprises a cylinder of ceramic. And, it provides such a system wherein such ceramic comprises at least 90% alumina. Further, it provides such a system wherein such at least one force-change absorber comprises at least one elastic layer of material. Even further, it provides such a system wherein such at least one elastic layer of material comprises rubber.

Moreover, it provides such a system wherein such rubber comprises vulcanized rubber. Additionally, it provides such a system wherein such bond comprises at least one vulcanized bond. Also, it provides such a system wherein such vulcanized bond comprises a strength that exceeds the tensile strength of such rubber. In addition, it provides such a system wherein such at least one interior-wear resister comprises a thickness of about ½ inch. And, it provides such a system wherein such at least one force-change absorber comprises a thickness of about 5/16 inch.

In accordance with another preferred embodiment hereof, this invention provides a system, relating to providing interior wear-resisting surfaces inside abrasive-material-handling pipes, comprising: at least one abrasive-material-handling pipe structured and arranged to internally handle at least one flow of abrasive material; at least one interior-wear resister structured and arranged to resist wear of the inside surface of such at least one abrasive-material-handling pipe; at least one force-change absorber structured and arranged to absorb force-changes occurring inside of such at least one abrasive-material-handling pipe while handling at least one flow of abrasive material; and at least one bond structured and arranged to bond such at least one interior-wear resister inside such at least one abrasive-material-handling pipe; wherein such at least one interior-wear resister comprises at least one layer of ceramic; wherein such layer of ceramic comprises a cylinder of ceramic; wherein such at least one force-change absorber comprises at least one elastic layer of material; wherein such at least one elastic layer of material comprises rubber; wherein such rubber comprises vulcanized rubber; and wherein such bond comprises at least one vulcanized bond. Additionally, it provides such a system wherein such at least one interior-wear resister comprises a thickness of about ½ inch. Further, it provides such a system wherein such at least one force-change absorber comprises a thickness of about 5/16 inch. Even further, it provides such a system wherein such vulcanized bond comprises a strength that exceeds the tensile strength of such rubber. Moreover, it provides such a system wherein such ceramic comprises at least 90% alumina.

In accordance with another preferred embodiment hereof, this invention provides a system, relating to providing interior wear-resisting surfaces inside abrasive-material-handling pipes, comprising: at least one abrasive-material-handling pipe structured and arranged to internally handle at least one flow of abrasive material; interior wear-resister means for resisting wear of the inside surface of such at least one abrasive-material-handling pipe; force-change absorber means for absorbing force-changes occurring inside of such at least one abrasive-material-handling pipe while handling at least one flow of abrasive material; and bond means for bonding such interior wear-resister means inside such at least one abrasive-material-handling pipe.

Additionally, it provides such a system wherein such force-change absorber means comprises pressure-change absorber means for absorbing pressure changes occurring inside of such at least one abrasive-material-handling pipe while handling at least one flow of abrasive material. Also, it provides such a system wherein such force-change absorber means comprises impact absorber means for absorbing impacts occurring inside of such at least one abrasive-material-handling pipe while handling at least one flow of abrasive material.

In addition, it provides such a system wherein such force-change absorber means comprises: pressure-change absorber means for absorbing pressure changes occurring inside of such at least one abrasive-material-handling pipe while handling at least one flow of abrasive material; and impact absorber means for absorbing impacts occurring inside of such at least one abrasive-material-handling pipe while handling at least one flow of abrasive material.

In accordance with another preferred embodiment hereof, this invention provides a system, relating to providing interior wear-resisting surfaces inside abrasive-material handling-pipes, comprising: at least one interior-tube wear-resisting surface structured and arranged to provide at least one wear-resisting surface inside the abrasive-material handling-pipe; wherein such at least one interior-tube wear-resisting surface comprises at least one wear-resister element means structured and arranged to resist wear of such at least one interior-tube wear-resisting surface; and at least one elastic liner structured and arranged to permanently attach such at least one wear-resister element to the abrasive-material handling-pipe.

And, it provides such a system wherein such at least one elastic liner comprises an elastomeric material structured and arranged to vulcanize-bond and pressure-cure such at least one wear-resister element with such abrasive-material handling-pipe. Further, it provides such a system wherein such elastomeric material comprises rubber. Even further, it provides such a system wherein such at least one wear-resister element comprises at least one ceramic element means structured and arranged to increase wearability of such at least one replaceable surface.

Even further, it provides such a system wherein such at least one ceramic element means comprises a minimum of 90% alumina. Even further, it provides such a system wherein such at least one ceramic element comprises a ceramic tube. Even further, it provides such a system wherein such elastomeric liner centers such ceramic tube in the steel pipe. Even further, it provides such a system wherein such at least one ceramic element comprises alumina with tightly controlled particle size that increases wear-resisting life. Even further, it provides such a system wherein such vulcanize-bond has a tensile strength that is in excess of the tensile strength of the rubber.

Even further, it provides such a system wherein such elastomeric tube serves as a shock absorber for impact from material transported in the pipe. Even further, it provides such a system wherein such elastomeric tube serves as a shock absorber for rapid pressure changes in the pipe. Even further, it provides such a system wherein such elastomeric material comprises an elastomeric tube. Even further, it provides such a system wherein such vulcanize-bond eliminates longitudinal seams. Even further, it provides such a system wherein such steel pipe comprises flange members such that sections of interior-wear-resisting-surface-lined pipe may be attached to form a pipeline.

According to another preferred embodiment of the present invention, this invention provides for each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
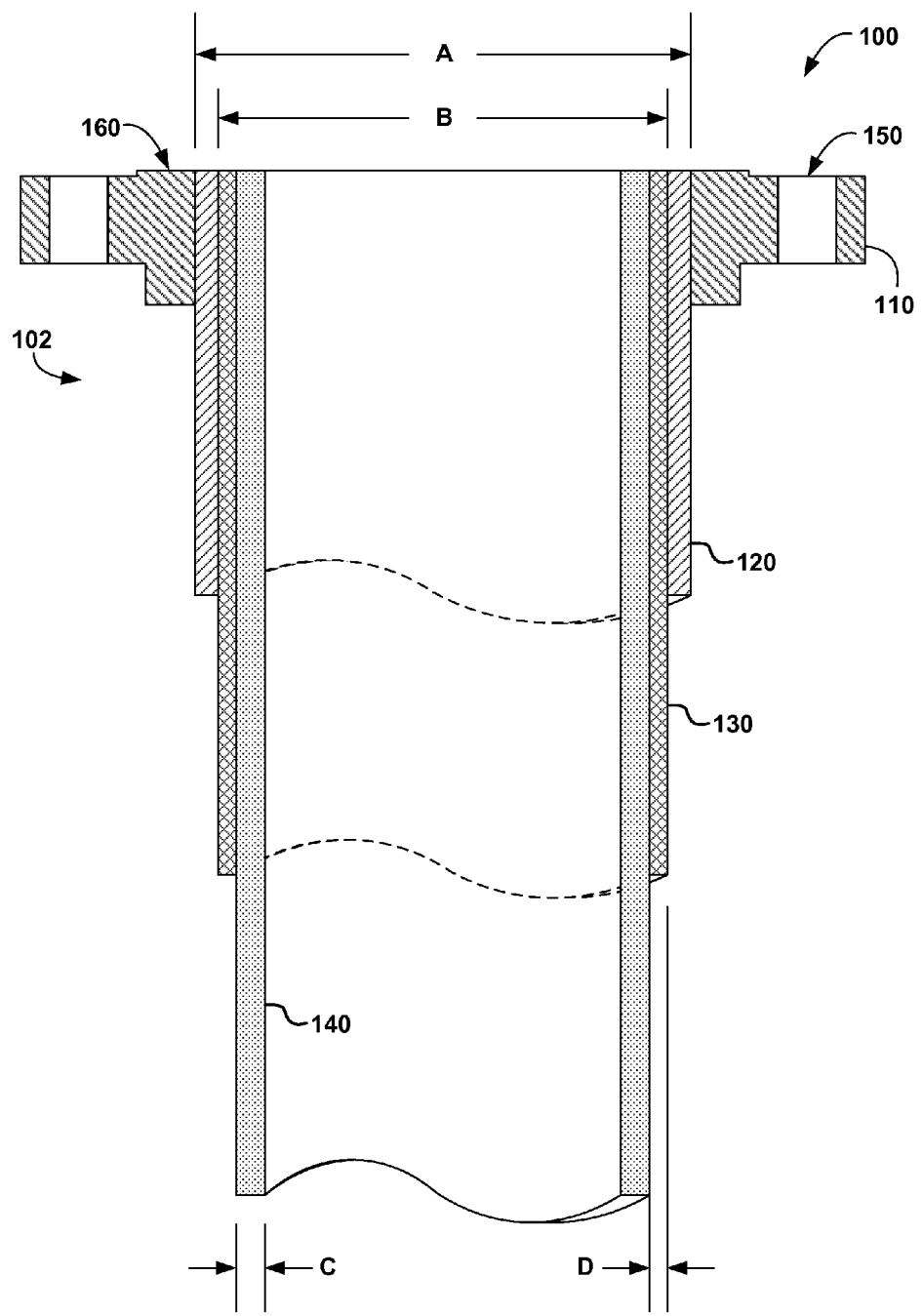
FIG. 1 shows a diagrammatic cross-section view of a section of pipe of the pipe liner systems, according to a preferred embodiment of the present invention.
Figure 2:
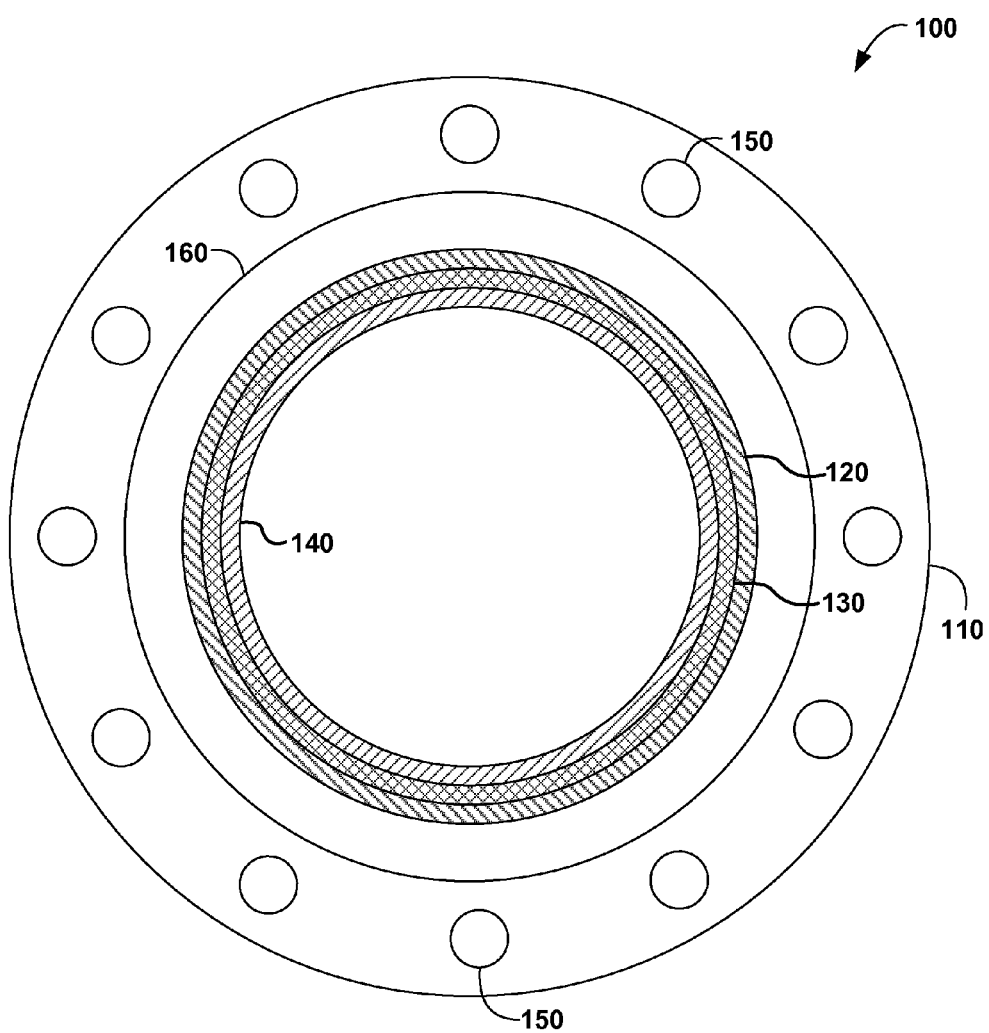
FIG. 2 shows a front view of the section of pipe, according to the preferred embodiment of FIG. 1.

FIG. 1 shows a diagrammatic cross-section view of a section of pipe 102 of the pipe liner systems 100, according to a preferred embodiment of the present invention. FIG. 2 shows a front view of the section of pipe 102, according to the preferred embodiment of FIG. 1. Pipe 102 preferably comprises a pipe 120, at least one rubberized liner 130 (at least embodying herein at least one force-change absorber structured and arranged to absorb force-changes occurring inside of said at least one abrasive-material-handling pipe while handling at least one flow of abrasive material; and at least embodying herein force-change absorber means for absorbing force-changes occurring inside of said at least one abrasive-material-handling pipe while handling at least one flow of abrasive material), and at least one wear-resistant layer 140 (at least embodying herein at least one interior-wear resister structured and arranged to resist wear of the inside surface of said at least one abrasive-material-handling pipe; and at least embodying herein interior wear-resister means for resisting wear of the inside surface of said at least one abrasive-material-handling pipe), as shown.

Pipe 120 preferably comprises metal, preferably steel. Pipe 120 preferably further comprises at least one abrasive material handling pipe structured and arranged to handle flow of abrasive materials from one location to another. Abrasive materials preferably comprise crushed rock, alternately preferably abrasive slurry. Upon reading the teachings of this specification, those skilled in the art will now appreciate that, under appropriate circumstances, considering such issues as cost, durability, available materials, etc., other pipe materials, such as, for example, other metals, ceramets, plastics, etc., may suffice.

Rubberized liner 130 preferably comprises rubber, preferably vulcanized rubber (at least herein embodying wherein said rubber comprises vulcanized rubber). Upon reading the teachings of this specification, those skilled in the art will now appreciate that, under appropriate circumstances, considering such issues as cost, available materials, etc., other liner materials, such as, for example, polymers, resins, etc., may suffice.

Wear-resistant layer 140 preferably comprises ceramic, preferably a single ceramic pipe-insert (at least herein embodying wherein said at least one interior-wear resister comprises at least one layer of ceramic). Upon reading the teachings of this specification, those skilled in the art will now appreciate that, under appropriate circumstances, considering such issues as cost, available materials, etc., other wear-resistant materials, such as, for example, cermets, resins, ceramic embedded plastics, etc., may suffice.

Wear-resistant layer 140 preferably is integrated with rubberized liner 130. Preferably, wear-resistant layer 140 is integrated with rubberized liner 130, particularly during use transporting highly abrasive materials, such as, for example, crushed rock. Rubberized liner 130 preferably bonds to wear-resistant layer 140 and pipe 120 (at least embodying herein at least one bond structured and arranged to bond said at least one interior-wear resister inside said at least one abrasive-material-handling pipe; and at least embodying herein bond means for bonding said interior wear-resister means inside said at least one abrasive-material-handling pipe).

Preferably solid ceramic cylinders are preferably vulcanize-bonded and pressure-cured in rubber to the interior of pipe 120; such design preferably eliminates longitudinal seams. The rubber bond strength between the wear-resistant layer 140 and pipe 120 preferably is in excess of the tensile strength of the rubber in rubberized liner 130 (at least herein embodying wherein said at least one bond comprises at least one vulcanized bond; and at least herein embodying wherein said vulcanized bond comprises a strength that exceeds the tensile strength of said rubber). Rubberized liner 130 (at least herein embodying wherein said at least one force-change absorber comprises at least one elastic layer of material) preferably functions as a shock absorber for impact from large rock impacts and rapid pressure changes that occur during the transport of such crushed rock through pipe 102 (at least herein embodying wherein said at least one force-change absorber comprises at least one pressure-change absorber structured and arranged to absorb pressure changes occurring inside of said at least one abrasive-material-handling pipe while handling at least one flow of abrasive material; and at least herein embodying wherein said force-change absorber means comprises pressure-change absorber means for absorbing pressure changes occurring inside of said at least one abrasive-material-handling pipe while handling at least one flow of abrasive material; and at least herein embodying wherein said force-change absorber means comprises impact absorber means for absorbing impacts occurring inside of said at least one abrasive-material-handling pipe while handling at least one flow of abrasive material; and at least herein embodying wherein said at least one force-change absorber comprises at least one impact absorber structured and arranged to absorb impacts occurring inside of said at least one abrasive-material-handling pipe while handling at least one flow of abrasive material). Applicant has determined pipe 102 will withstand pressures greater than 400 psi with no apparent cracks or chipping.

Wear-resistant layer 140, preferably comprising at least one ceramic cylinder, preferably comprises a minimum of 90% alumina (at least herein embodying wherein said ceramic comprises at least 90% alumina). Further, such alumina preferably has tightly controlled particle size, which preferably greatly increases the wear-resisting life.

Applicant preferably inserts rubberized liner 130 with ceramic layer 140 into pipe 120 and preferably then heats the pipe causing integral bonding of the rubberized liner 130 to the steel pipe 120. Steel pipe 120 preferably comprises flange members 110 such that sections of intricately-bonded rubberized-ceramic-liner pipe may be preferably attached to form a highly durable pipeline for transport of highly abrasive materials, highly preferably comprising mined rock.

Flange members 110 preferably comprise a plurality of bolt holes 150, as shown, to allow end-to-end pipe connections. Flange members preferably further comprise a pipe-to-pipe connection surface 160, as shown, preferably to allow continuous surface contact between joined pipes 102.

Pipe 120 preferably comprises an outer diameter A and an inner diameter B. Rubberized liner 130 preferably comprises a thickness D of about 5/16 inch (at least herein embodying wherein said at least one force-change absorber comprises a thickness of about 5/16 inch), preferably with an outside diameter equivalent to inner diameter B of pipe 120. Wear-resistant layer 140 preferably comprises a thickness C of about ½ inch (at least herein embodying wherein said at least one interior-wear resister comprises a thickness of about ½ inch), preferably with an outside diameter equivalent to inner diameter B of pipe 120 less twice thickness D of rubberized liner 130 (or equivalent to the inner diameter of rubberized liner 130).

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to providing interior wear-resisting surfaces inside abrasive-material-handling pipes, comprising:
    a) at least one abrasive-material-handling pipe structured and arranged to internally handle at least one flow of abrasive material;
    b) at least one interior-wear resister structured and arranged to resist wear of the inside surface of said at least one abrasive-material-handling pipe;
    c) at least one force-change absorber structured and arranged to absorb force-changes occurring inside of said at least one abrasive-material-handling pipe while handling at least one flow of abrasive material; and
    d) at least one bond structured and arranged to bond said at least one interior-wear resister inside said at least one abrasive-material-handling pipe;
    e) wherein said at least one force-change absorber comprises at least one elastic layer of vulcanized rubber.

2. The system according to claim 1 wherein said at least one force-change absorber comprises at least one pressure-change absorber structured and arranged to absorb pressure changes occurring inside of said at least one abrasive-material-handling pipe while handling at least one flow of abrasive material.

3. The system according to claim 1 wherein said at least one force-change absorber comprises at least one impact absorber structured and arranged to absorb impacts occurring inside of said at least one abrasive-material-handling pipe while handling at least one flow of abrasive material.

4. The system according to claim 1 wherein said at least one interior-wear resister comprises at least one layer of ceramic.

5. The system according to claim 4 wherein said layer of ceramic comprises a cylinder of ceramic.

6. The system according to claim 5 wherein said ceramic comprises at least 90% alumina.

7. The system according to claim 1 wherein said at least one bond comprises at least one vulcanized bond.

8. The system according to claim 7 wherein said vulcanized bond comprises a strength that exceeds the tensile strength of said rubber.

9. The system according to claim 1 wherein said at least one interior-wear resister comprises a thickness of about ½ inch.

10. The system according to claim 9 wherein said at least one force-change absorber comprises a thickness of about 5/16 inch.

11. A system, relating to providing interior wear-resisting surfaces inside abrasive-material-handling pipes, comprising:
   a) at least one abrasive-material-handling pipe structured and arranged to internally handle at least one flow of abrasive material;
   b) at least one interior-wear resister structured and arranged to resist wear of the inside surface of said at least one abrasive-material-handling pipe;
   c) at least one force-change absorber structured and arranged to absorb force-changes occurring inside of said at least one abrasive-material-handling pipe while handling at least one flow of abrasive material; and
   d) at least one bond structured and arranged to bond said at least one interior-wear resister inside said at least one abrasive-material-handling pipe;
   e) wherein said at least one interior-wear resister comprises at least one layer of ceramic;
   f) wherein said layer of ceramic comprises a cylinder of ceramic;
   g) wherein said at least one force-change absorber comprises at least one elastic layer of vulcanized rubber; and
   h) wherein said at least one bond comprises at least one vulcanized bond.

12. The system according to claim 11 wherein said at least one interior-wear resister comprises a thickness of about ½ inch.

13. The system according to claim 12 wherein said at least one force-change absorber comprises a thickness of about 5/16 inch.

14. The system according to claim 11 wherein said vulcanized bond comprises a strength that exceeds the tensile strength of said rubber.

15. The system according to claim 11 wherein said ceramic comprises at least 90% alumina.

16. A system, relating to providing interior wear resisting surfaces inside abrasive-handling pipes, comprising:
   a) at least one abrasive-material-handling pipe structured and arranged to internally handle at least one flow of abrasive material;
   b) at least one interior-wear resister structured and arranged to resist wear of the inside surface of said at least one abrasive-material-handling pipe;
   c) at least one force-change absorber structured and arranged to absorb force-changes occurring inside of said at least one abrasive-material-handling pipe while handling at least one flow of abrasive material;
   d) at least one bond structured and arranged to bond said at least one interior-wear resister inside said at least one abrasive-material-handling pipe;
   e) wherein said at least one interior-wear resister comprises at least one layer of ceramic;
   f) wherein said layer of ceramic comprises a cylinder of ceramic; and
   g) wherein said ceramic comprises at least 90% alumina.

17. The system according to claim 16 wherein said at least one force-change absorber comprises at least one pressure-change absorber structured and arranged to absorb pressure changes occurring inside of said at least one abrasive-material-handling pipe while handling at least one flow of abrasive material.

18. The systems according to claim 16 wherein said at least one force-change absorber comprises at least one impact absorber structured and arranged to absorb impacts occurring inside of said at least one abrasive-material-handling pipe while handling at least one flow of abrasive material.

* * * * *